(12) United States Patent
Shiba

(10) Patent No.: US 7,077,775 B2
(45) Date of Patent: Jul. 18, 2006

(54) OXA(THIA)ZOLIDINE COMPOUNDS, PROCESS FOR PREPARATION THEREOF AND ANTI-INFLAMMATORY AGENTS

(75) Inventor: Toyomi Shiba, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/921,996

(22) Filed: Aug. 6, 2001

(65) Prior Publication Data

US 2002/0025872 A1 Feb. 28, 2002

(30) Foreign Application Priority Data

Aug. 7, 2000 (JP) ............................. 2000-238184

(51) Int. Cl.
*F16G 1/22* (2006.01)
*F16G 5/16* (2006.01)

(52) U.S. Cl. ...................................... 474/242; 474/201

(58) Field of Classification Search ............... 474/242, 474/244, 245, 201, 248, 240, 246
See application file for complete search history.

(56) References Cited

U.S. PATENT DOCUMENTS

| | | | | |
|---|---|---|---|---|
| 4,371,361 A | * | 2/1983 | Giacosa | 474/201 |
| 4,498,892 A | | 2/1985 | Huntley | |
| 4,560,371 A | * | 12/1985 | Hattori | 474/201 |
| 5,123,879 A | * | 6/1992 | Lecouturier et al. | 474/242 |
| 5,123,880 A | * | 6/1992 | Sekine et al. | 474/244 |
| 5,236,401 A | * | 8/1993 | Matsuo | 474/242 |
| 6,123,637 A | * | 9/2000 | Yagasaki | 474/242 |

FOREIGN PATENT DOCUMENTS

| | | | |
|---|---|---|---|
| DE | 24 14 989 | | 10/1975 |
| DE | 2414891 A1 | * | 10/1975 |
| DE | 2557724 A1 | * | 6/1977 |
| EP | 0 151 396 | | 8/1985 |
| EP | 0 367 620 | | 5/1990 |
| EP | 0 510 990 | | 10/1992 |
| EP | 0 562 654 | | 9/1993 |
| EP | 0 626 526 | | 11/1994 |
| JP | 59-50252 A | * | 3/1984 |
| WO | WO 00/28237 A1 | * | 5/2000 |

* cited by examiner

*Primary Examiner*—Marcus Charles
(74) *Attorney, Agent, or Firm*—Arent Fox PLLC

(57) ABSTRACT

A metal belt for a continuously variable transmission includes many metal elements assembled to an endless metal ring assembly, and is wound around drive and driven pulleys to transmit a driving force. A retainer comprising an endless resilient member deformable radially is disposed between a lower face of an ear of a ring slot in the metal element and a radially outer peripheral surface of the metal ring assembly. When the metal elements are inclined in such a manner that they are fallen forwards in the vicinity of an exit portion of the driven pulley, the metal ring assembly is prevented from strongly interfering with a lower face of the ear and a saddle face by a buffering action provided when the retainer is deformed radially, thereby preventing the wear of the metal belt to enhance its durability without increasing the processing cost for the metal elements.

7 Claims, 12 Drawing Sheets

TANGENT FRICTIONAL FORCE F

TANGENT FRICTIONAL FORCE F

URGING FORCE E BETWEEN METAL ELEMENTS

_US 7,077,775 B2_

1

OXA(THIA)ZOLIDINE COMPOUNDS, PROCESS FOR PREPARATION THEREOF AND ANTI-INFLAMMATORY AGENTS

BACKGROUND OF THE INVENTION

1. Field of the Invention

The present invention relates to a belt for a continuously variable transmission, which is wound around a drive pulley and a driven pulley for transmitting a driving force between both the pulleys, and which comprises a metal ring assembly formed of a plurality of endless metal rings laminated one on another, and a large number of metal elements each having a ring slot into which the metal ring assembly is fitted.

2. Description of the Related Art

As shown in FIG. 8, the metal elements 32 are supported on the metal ring assemblies 31, 31 which are fitted into the ring slots 35, 35. If the metal elements 32 are inclined forwards in a travel direction, rear ends a of saddle faces 38L, 38L in the travel direction abut against inner peripheral surfaces of the metal ring assemblies 31, 31, and front ends of the lower faces 38U, 38U of an ear abut against the outer peripheral surfaces of the metal ring assemblies 31, 31. For this reason, there is a possibility that a large stress OH (Hertz's stress) is generated at such abutment portions and as a result, the metal ring assemblies 31, 31 are worn. The forward inclination of the metal elements 32 in the travel direction is caused by a tangent frictional force F received by the metal elements 32 at their contact faces with the pulleys, and an urging force between the metal elements 32, and is particularly significant at an exit portion of the driven pulley. The reason will be described below.

As can be seen from FIG. 7, a moment generated in a direction of an arrow M by the tangent frictional force F acts to incline the metal elements 32 forwards in the travel direction about a swinging center C. On the other hand, a radial frictional force μE generated by the urging force E between the metal elements 32 generates a moment in a direction of an arrow M' on the metal elements 32. This moment acts to incline the metal elements 32 rearwards in the travel direction about the swinging center C.

It is known that the tangent frictional force F received by the metal elements 32 from the pulleys 6 and 11 is large at the exit portions of the drive pulley 6 and the driven pulley 11 as shown in FIG. 9A, and its value reaches four times a value provided when it is supposed that the tangent frictional force F has been averagely distributed over the entire wound regions of the pulleys 6 and 11. In addition, as shown in FIG. 9B, the urging force between the metal elements 32 has a larger value at the exit portion of the drive pulley 6, but assumes 0 (zero) at the exit portion of the driven pulley 11. Therefore, the metal elements 32 are liable to be inclined forwards in the travel direction to the largest extent at a location where the tangent frictional force F inclining the metal element 32 forwards in the travel direction is largest and the urging force E inhibiting the forward inclination of the metal element 32 in the travel direction is 0 (zero), i.e., at the exit portion of the driven pulley 11 (see FIG. 10).

For this reason, when the metal elements 32 are inclined largely forwards in the travel direction at the exit portion of the driven pulley 11, the following problem is encountered: The rear ends a of the saddle faces 38L, 38L of the metal element 32 and the front ends b of the lower faces 38U, 38U of the ear as viewed in the travel direction strongly abut against the inner and outer peripheral surfaces of the metal ring assembly 31, respectively (see FIG. 8) and as a result,

2 the metal ring assemblies 31, 31 are worn by a stress σH generated at such abutment portions.

There are conventionally known metal elements which are described in Japanese Utility Model Application Laid-open Nos. 59-79653 and 63-17353, Japanese Patent Application Laid-open No. 6-10993 and Japanese Utility Model Application Laid-open No. 60-107444, and which have a feature in shape of a saddle face against which an inner peripheral surface of a metal ring assembly abuts.

Belts designed so that the rolling of a metal element is inhibited to enhance the durability of a metal ring assembly, are conventionally known from Japanese Patent Publication No. 2-19338, Japanese Patent Application Laid-open No. 7-12177 and Japanese Patent Publication No. 2,617,784.

In the belt described in Japanese Utility Model Application Laid-open No.59-79653, opposite edges of a saddle face of the metal element in a travel direction are smoothly chamfered. In the belt described in Japanese Utility Model Application Laid-open No.63-17353, a stepped protrusion is formed at a central portion in a travel direction of the saddle face of the metal element, and an arcuate face having a radius equal to a minimum winding radius of the metal ring assembly is formed on top of the protrusion. The purpose of this arrangement is not described clearly in the specification, but it seems that the purpose is to alleviate the strong abutment between the opposite ends of the saddle face in the travel direction and the inner peripheral surface of the metal ring assembly at the portions of the belt for continuously variable transmission which are wound around the pulleys. In these belts, the shapes of the saddle faces are symmetrical longitudinally in the travel direction and for this reason, it is difficult to effectively alleviate the Hertz's stress generated by the abutment between the opposite ends of the saddle face in the travel direction and the inner peripheral surface of the metal ring assembly.

In the belts described in Japanese Patent Application Laid-open No.6-10993 and Japanese Utility Model Application Laid-open No.60-107444, the longitudinal shapes of the saddle face of the metal element are formed asymmetrically in such a manner that the rear portion of the saddle face in the travel direction is lower in height level than the front portion in the travel direction, for the purpose of preventing the inclination of the metal element in the longitudinal direction by a pitching moment. These belts suffer from a problem of an increase in processing cost for the metal element, because the shape of the saddle face is complicated.

The belts described in the above Japanese Patent Publication Nos. 2-19338 and 7-12177, and Japanese Patent Publication No. 2,617,784 are for suppressing a rolling of the metal elements, and cannot solve the problem of wear in the metal ring assemblies due to a pitching of the metal elements.

The present invention has been accomplished with the above circumstance in view, and it is an object of the present invention to prevent the wear of the metal ring assembly due to the inclination of the metal element without increasing of the processing cost for the metal element.

To achieve the above object, according to a first feature of the present invention, there is provided a belt for a continuously variable transmission, which is wound around a drive pulley and a driven pulley for transmitting a driving force between both the pulleys, the belt comprising a metal ring assembly formed of a plurality of endless metal rings laminated one on another, and a large number of metal elements each having a ring slot into which the metal ring assembly is fitted, wherein an endless resilient member which is elastically deformable radially is disposed between a radially outer edge of the ring slot in the metal element and a radially outer peripheral surface of the metal ring assembly.

With the above arrangement, the endless resilient member which is deformable radially is disposed between the radially outer edge of the ring slot in the metal element and the radially outer peripheral surface of the metal ring assembly. Therefore, when the metal elements are inclined in such a manner that they are fallen forwards in the vicinity of an exit portion of the driven pulley of the metal belt type continuously variable transmission, the metal ring assembly can be prevented from strongly interfering with the radially outer and inner edges of the ring slot in the metal ring assembly by a buffering action provided when the resilient member is deformed radially, thereby preventing wear of the metal belt to enhance the durability thereof. Moreover, the belt is of a simple structure in which the resilient member is only added without subjecting the metal element to a special processing, and hence, the belt can be realized at an extremely low cost.

According to a second feature of the present invention, the peripheral length of the radially inner peripheral surface of the resilient member is set longer than that of the radially outer peripheral surface of the metal ring assembly.

With the above arrangement, the peripheral length of the radially inner peripheral surface of the resilient member is longer than that of the radially outer peripheral surface of the metal ring assembly, and hence, a clearance can be created between the resilient member and the metal ring assembly, to thereby further increase the buffering action of the resilient member.

DESCRIPTION OF THE PREFERRED EMBODIMENTS

The mode for carrying out the present invention will now be described by way of embodiments of the present invention shown in the accompanying drawings.

FIGS. 1 to 7 shows a first embodiment of the present invention.

Figure 1:
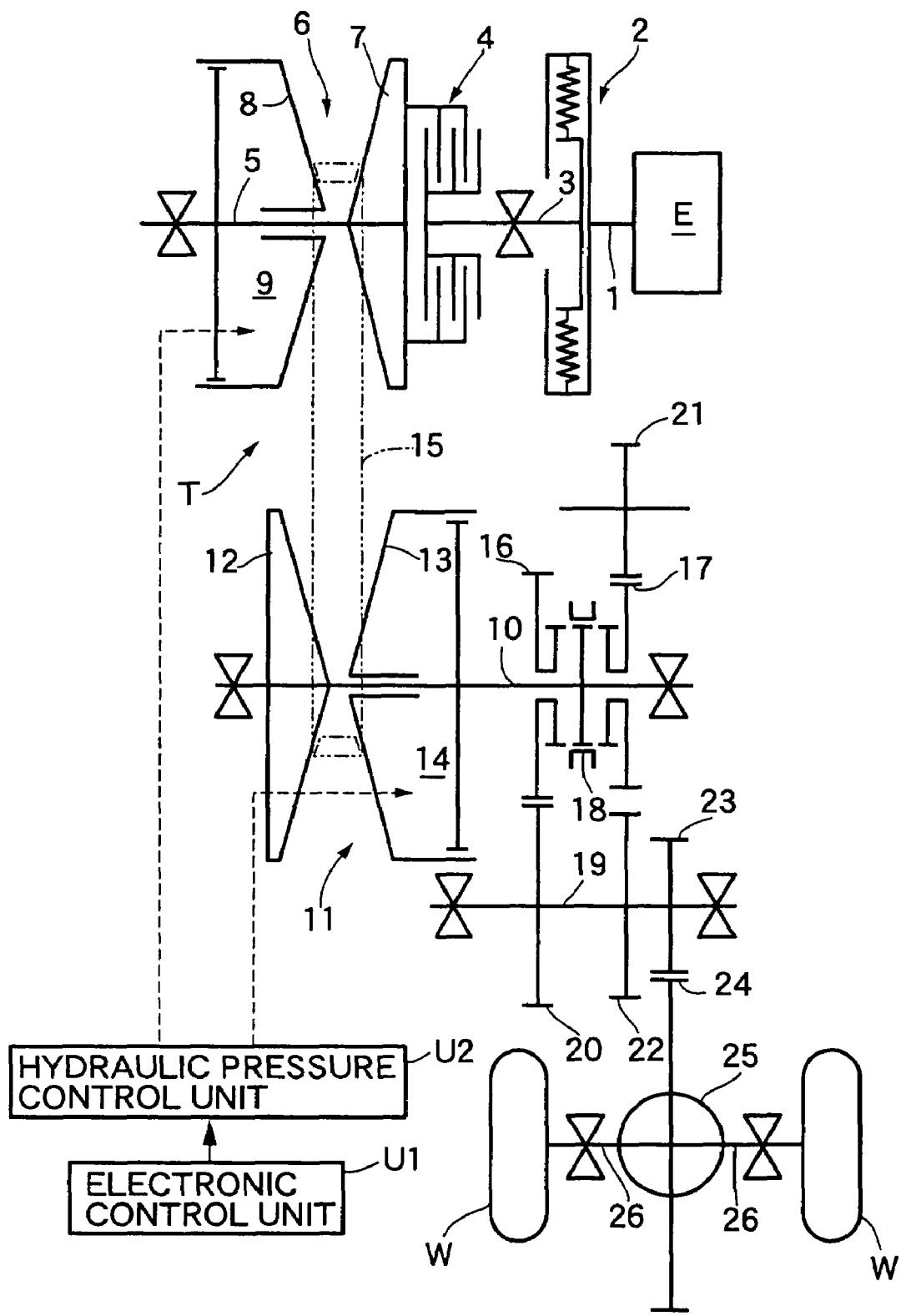
FIG. 1 is a skeleton illustration of a power transmitting system for a vehicle equipped with a continuously variable transmission.

FIG. 1 schematically shows the structure of a metal belt type continuously variable transmission T mounted on an automobile. An input shaft 3 connected to a crankshaft 1 of an engine E through a damper 2 is connected to a driving shaft 5 of the metal belt type continuously variable transmission T through a starting clutch 4. A drive pulley 6 provided on the driving shaft 5 comprises a stationary pulley half 7 secured to the driving shaft 5, and a movable pulley half 8 capable of moving toward and away from the stationary pulley half 7. The movable pulley half 8 is forced toward the stationary pulley half 7 by a hydraulic pressure applied to an oil chamber 9.

A driven pulley 11 is provided on a driven shaft 10 disposed in parallel to the driving shaft 5, and comprises a stationary pulley half 12 secured to the driven shaft 10, and a movable pulley half 13 capable of moving toward and away from the stationary pulley half 12. The movable pulley half 13 is forced toward the stationary pulley half 12 by a hydraulic pressure applied to an oil chamber 14. A metal belt 15 is wound around the drive pulley 6 and the driven pulley 11, and comprises a large number of metal elements 32 supported on a pair of left and right metal ring assemblies 31, 31 (see FIG. 2). Each of the metal ring assemblies 31, 31 comprises, for example, 12 metal rings 33 which are laminated on one another.

A forward drive gear 16 and a backward drive gear 17 are relatively rotatably supported on the driven shaft 10. The forward drive gear 16 and the backward drive gear 17 can be coupled selectively to the driven shaft 10 by a selector 18. A forward driven gear 20 meshed with the forward drive gear 16 and a backward driven gear 22 meshed with the backward drive gear 17 through a backward idling gear 21 are secured to an output shaft 19 which is disposed in parallel to the driven shaft 10.

The rotation of the output shaft 19 is input to a differential 25 through a final drive gear 23 and a final driven gear 24, and is transmitted therefrom through left and right axles 26, 26 to driven wheels W, W.

A driving force of the engine E is transmitted to the driven shaft 10 through the crankshaft 1, the damper 2, the input shaft 3, the start clutch 4, the drive shaft 5, the driven pulley 6, the metal belt 15 and the driven pulley 11. When a forward travel range is selected, the driving force of the driven shaft 10 is transmitted to the output shaft 19 through the forward drive gear 16 and the forward driven gear 20, thereby allowing the vehicle to travel forwards. When a backward travel range is selected, the driving force of the driven shaft 10 is transmitted to the output shaft 19 through the backward drive gear 17, the backward idling gear 21 and the backward driven gear 22, thereby allowing the vehicle to travel backwards.

In this metal belt type continuously variable transmission T, hydraulic pressures applied to the oil chamber 9 of the drive pulley 6 and the oil chamber 14 of the driven pulley 11 are controlled by a hydraulic pressure control unit U2 which is operated by a command from an electronic control unit U1, thereby continuously adjusting the change gear ratio. Specifically, if a hydraulic pressure applied to the oil chamber 14 of the driven pulley 11 is increased relative to a hydraulic pressure applied to the oil chamber 9 of the drive pulley 6, the grove width of the driven pulley 11 is reduced, leading to an increased effective radius, and correspondingly, the groove width of the drive pulley 6 is increased, leading to a reduced effective radius. Therefore, the change gear ratio of the metal belt type continuous variable transmission T is continuously varied toward "LOW". On the other hand, if the hydraulic pressure applied to the oil chamber 9 of the drive pulley 6 is increased relative to the hydraulic pressure applied to the oil chamber 14 of the driven pulley 11, the groove width of the drive pulley 6 is reduced, leading to an increased effective radius, and correspondingly, the groove width of the driven pulley 11 is increased, leading to a reduced effective radius. Therefore, the change gear ratio of the metal belt type continuous variable transmission T is continuously varied toward "TOP".

Figure 2:
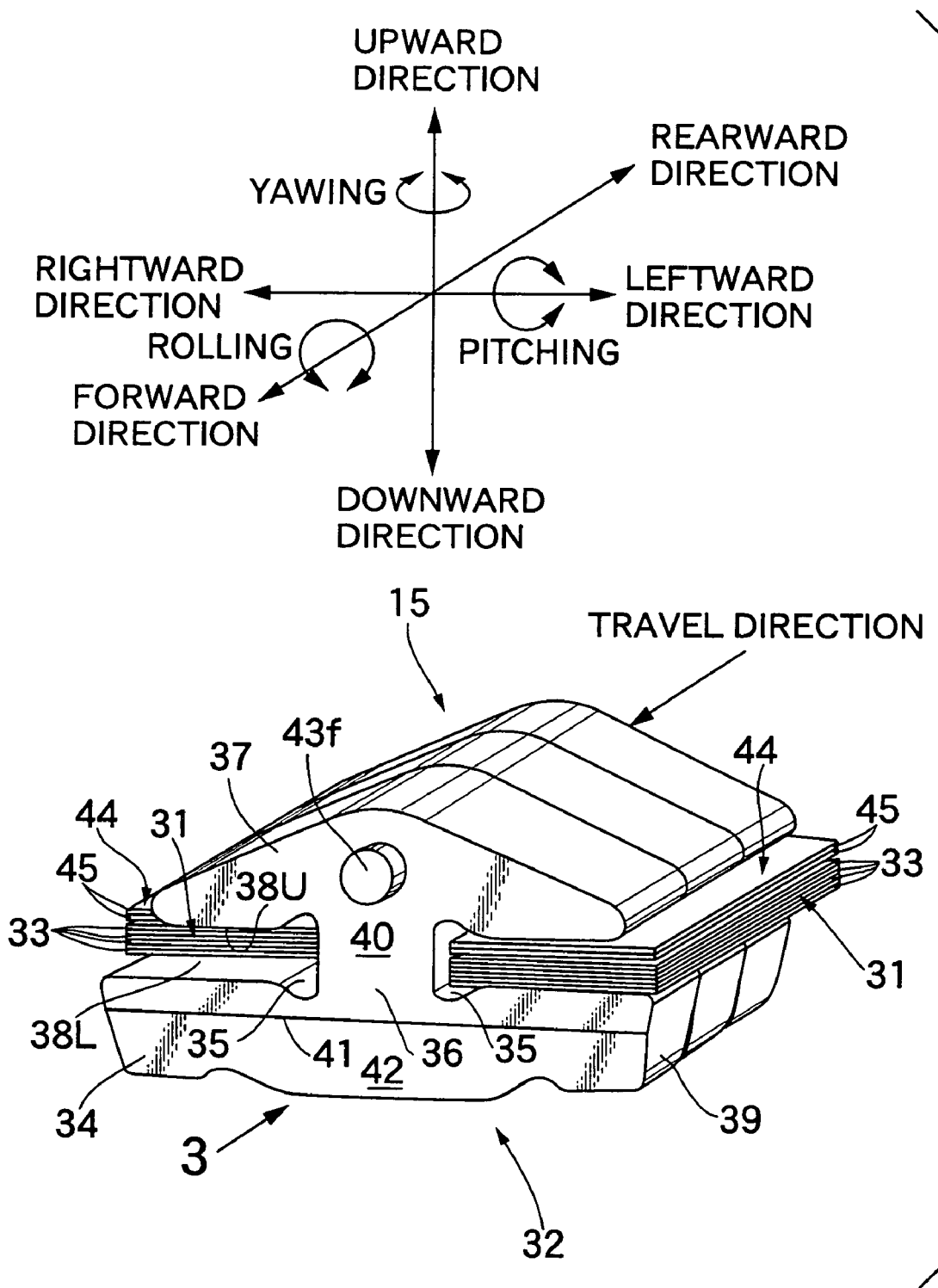
FIG. 2 is a partial perspective view of a metal belt.
Figure 3:
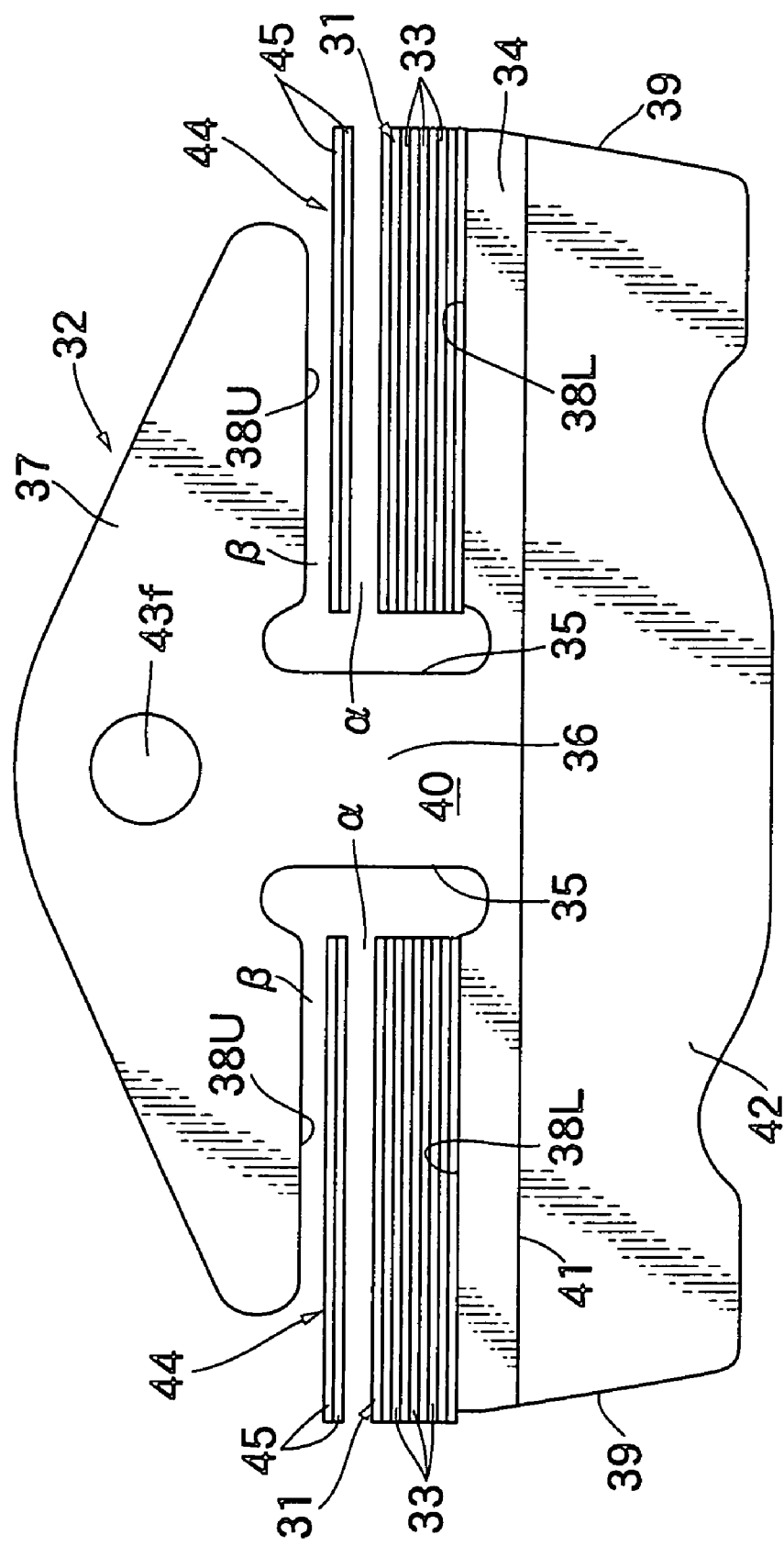
FIG. 3 is an enlarged view taken in a direction of an arrow 3 in FIG. 2.

As shown in FIG. 2, each of the metal elements 32 formed from a metal plate by punching, includes a substantially trapezoidal element body 34, a neck 36 located between a pair of left and right ring slots 35, 35 into which the metal ring assemblies 31, 31 are fitted, and a substantially triangular ear 37 connected to an upper portion of the element body 34 through the neck 36. The metal ring assemblies 31, 31 are sandwiched between saddle faces 38L, 38L constituting radially inner edges of the ring slots 35, 35 and lower faces 38U, 38U of the ear constituting radially outer edges of the ring slots 35, 35. The innermost metal rings 33, 33 of the metal ring assemblies 31, 31 are supported on the saddle faces 38L, 38L, and clearances are defined between the outermost metal rings 33, 33 of the metal ring assemblies 31, 31 and the lower faces 38U, 38U of the ear. Retainers 44, 44 formed into an endless band-shape from an resilient material are disposed in the clearances. The peripheral length of an inner surface of each of the retainers 44, 44 is set larger than that of an outer surface of each of the outermost metal rings 33, 33 and hence, a clearance a is defined between each of the retainers 44 and each of the outermost metal rings 33, 33 (see FIG. 3). A clearance β is also defined between each of the retainers 44, 44 and each of the lower faces 38U, 38U of the ear (see FIG. 3). In the present embodiment, the clearance a is set at 0.10 mm, and the clearance β is set at 0.05 mm. Setting the clearance β smaller than the clearance a ensures that the clearances can be defined between the outermost metal rings 33, 33 and the retainers 44, 44 over the entire peripheries of the metal belt assemblies, thereby providing a buffering effect.

Each of the metal ring assemblies 31, 31 comprises a laminate of eleven metal rings 33, and each of the retainers 44, 44 comprises two metal rings 45, 45 longer than the peripheral length of the outer surface of the outermost metal ring 33. The retainer 44 constitutes a resilient member of the present invention.

Figure 4:
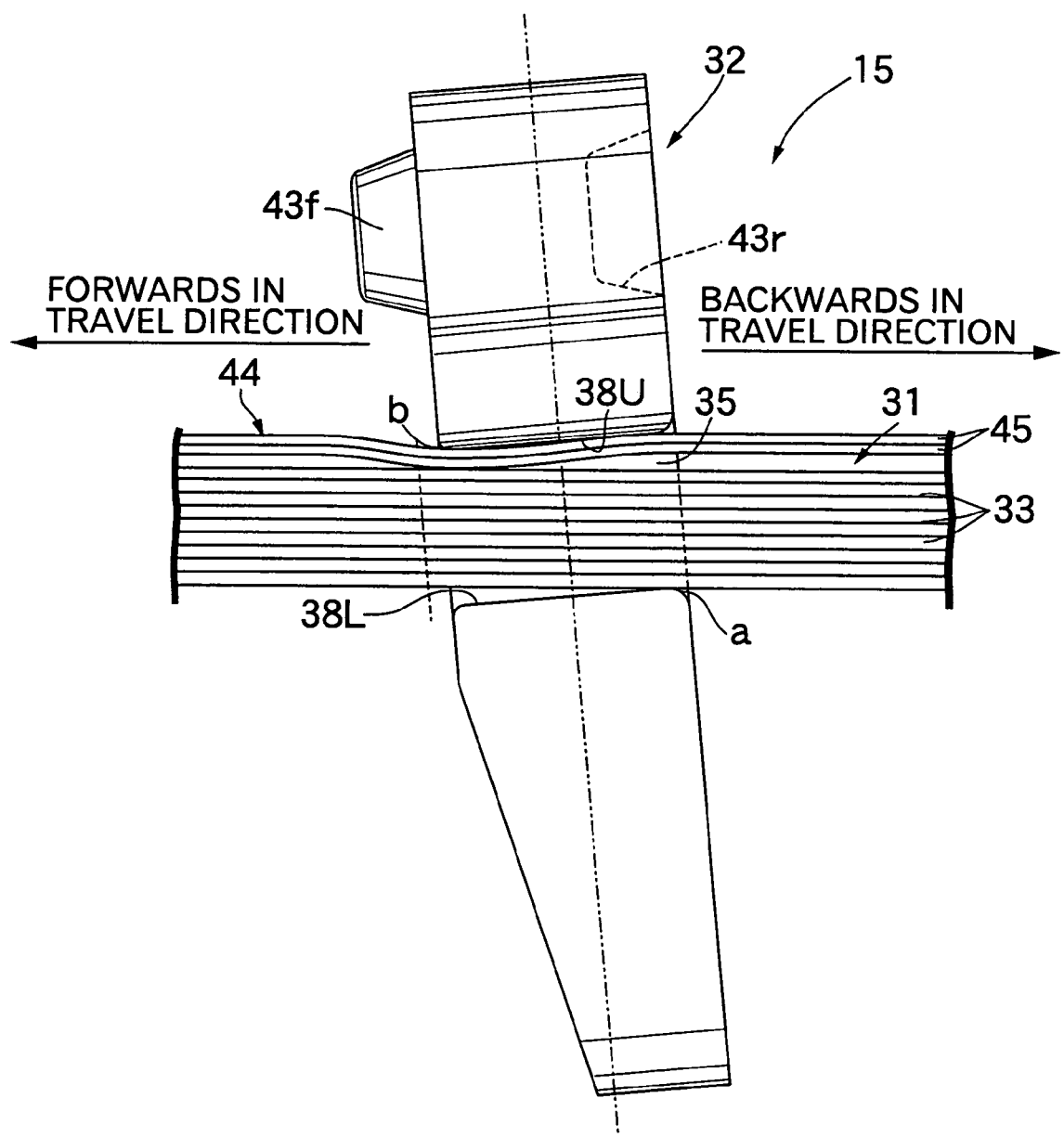
FIG. 4 is a diagram for explaining the shock-absorbing action of a retainer.
Figure 5A:
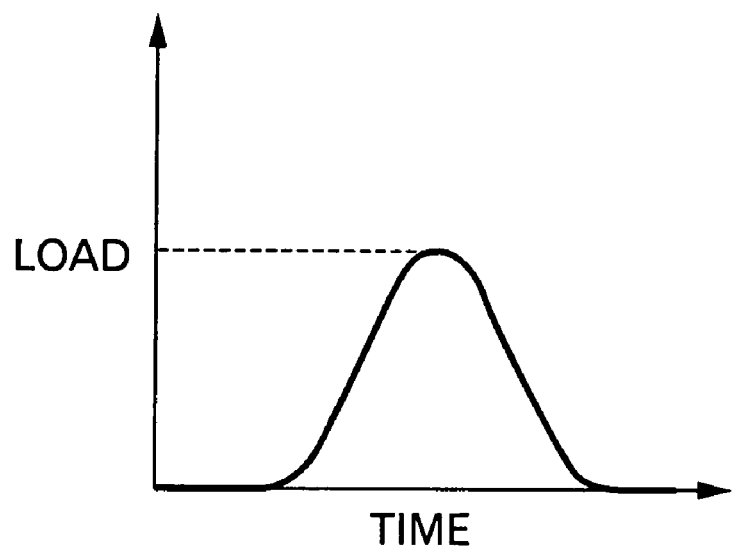
FIGS. 5A and 5B are graphs for explaining the shock-absorbing performance of the retainer.
Figure 5B:
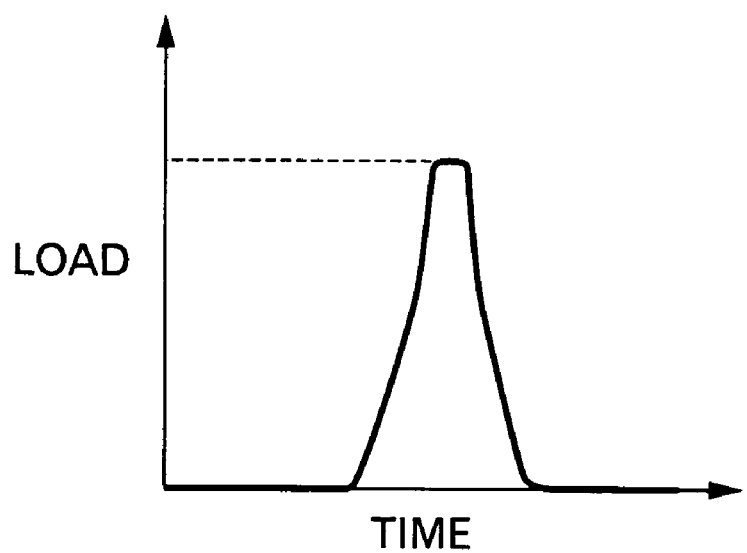
Figure 6A:
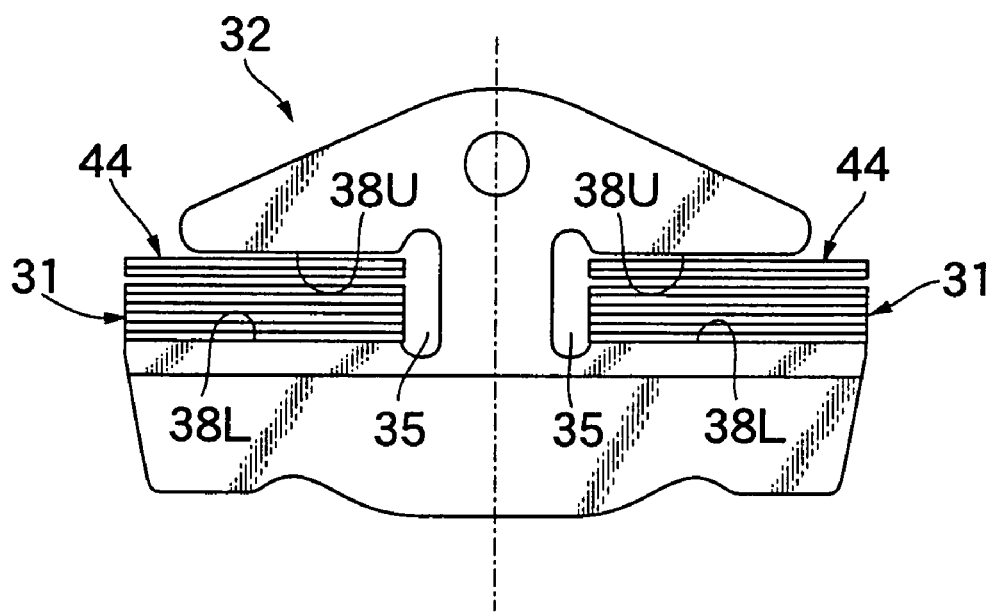
FIGS. 6A and 6B are views for explaining a function by the retainer for inhibiting the rolling of a metal element.
Figure 6B:
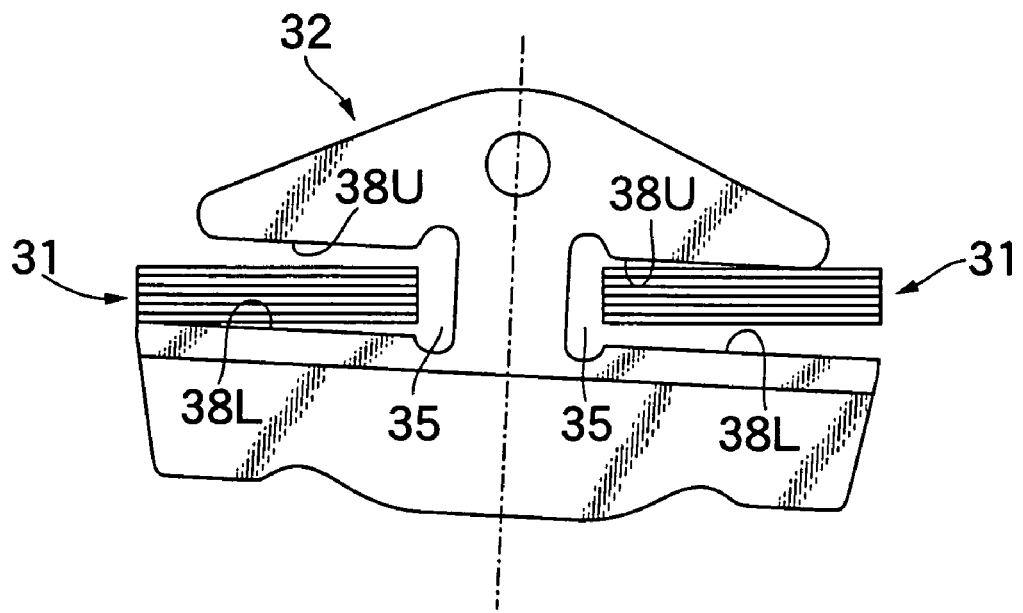
Figure 7:
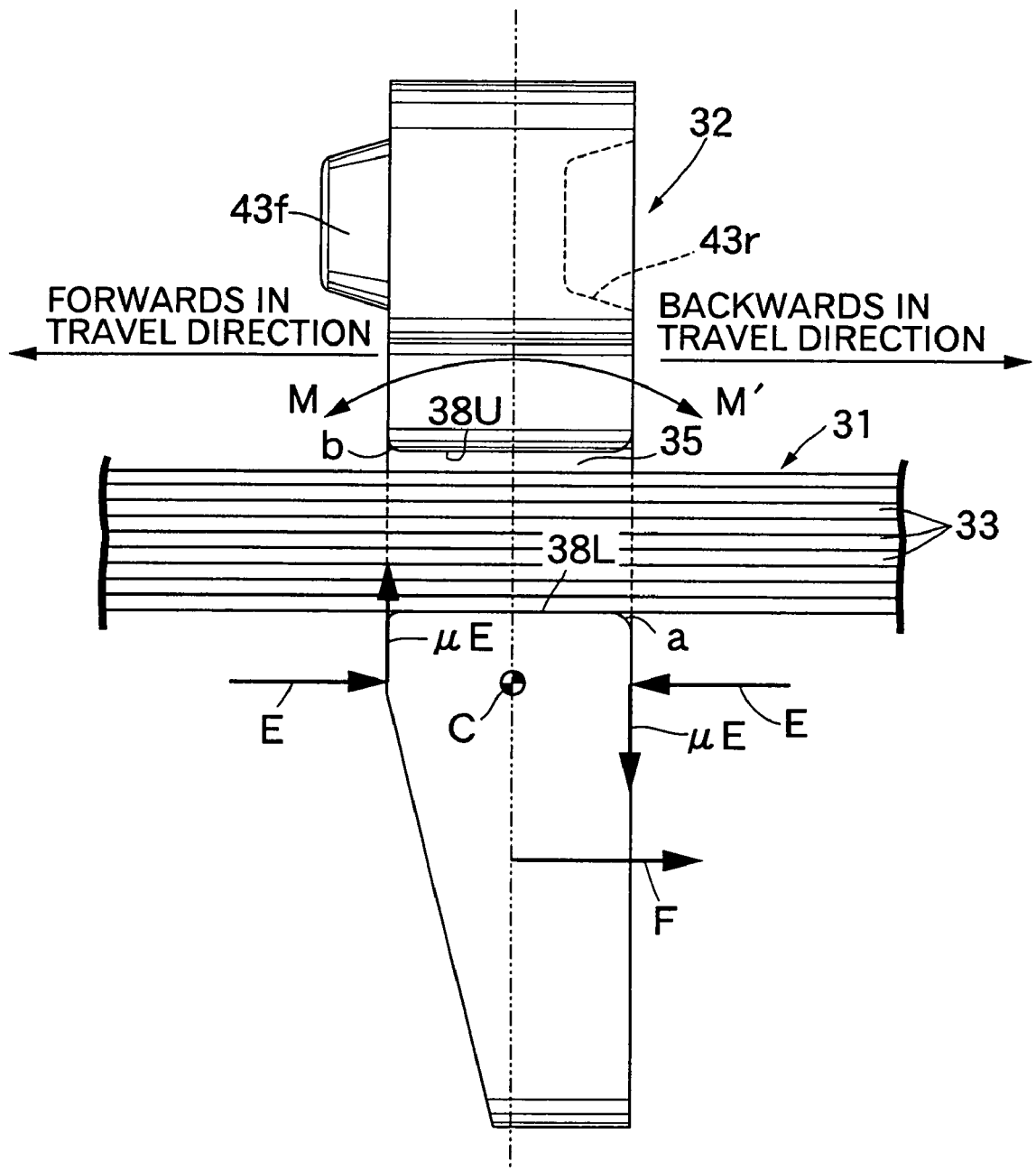
FIG. 7 is a side view of the metal element in an upright state.
Figure 8:
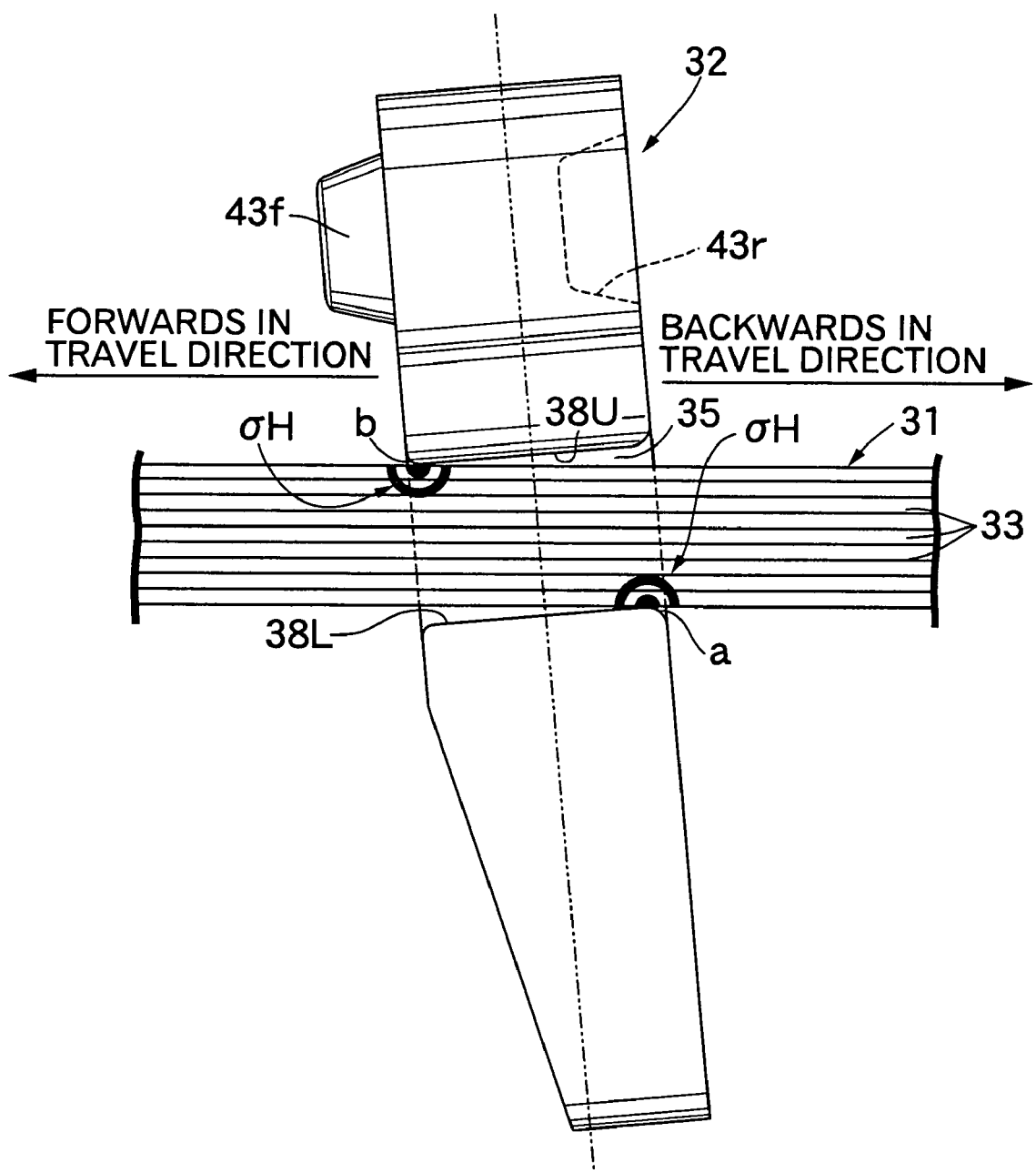
FIG. 8 is a side view of the metal element in an inclined state.
Figure 9A:
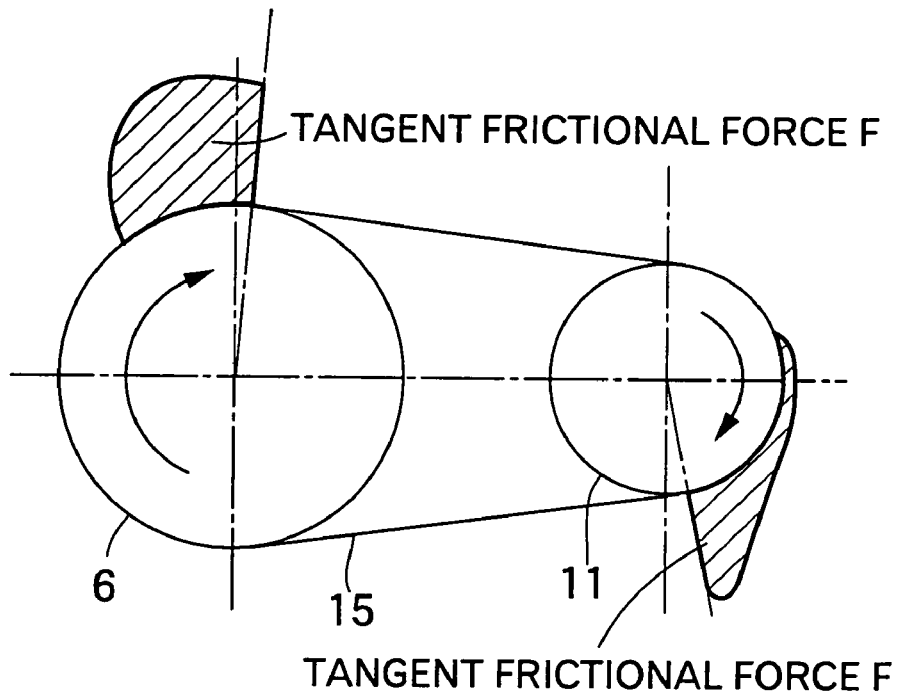
FIGS. 9A and 9B are a diagram showing the distribution of a tangent frictional force F received by the metal element from a pulley and the distribution of an urging force E between the metal elements.
Figure 9B:
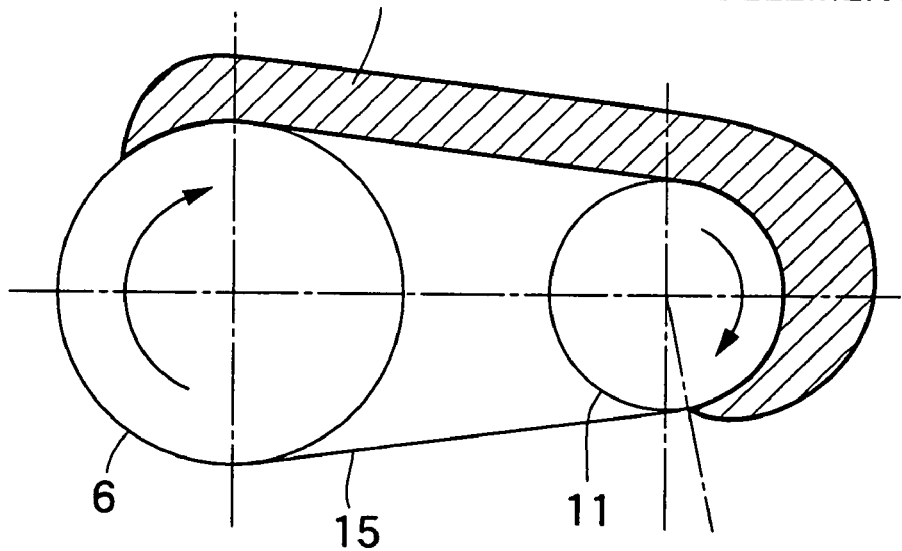
Figure 10:
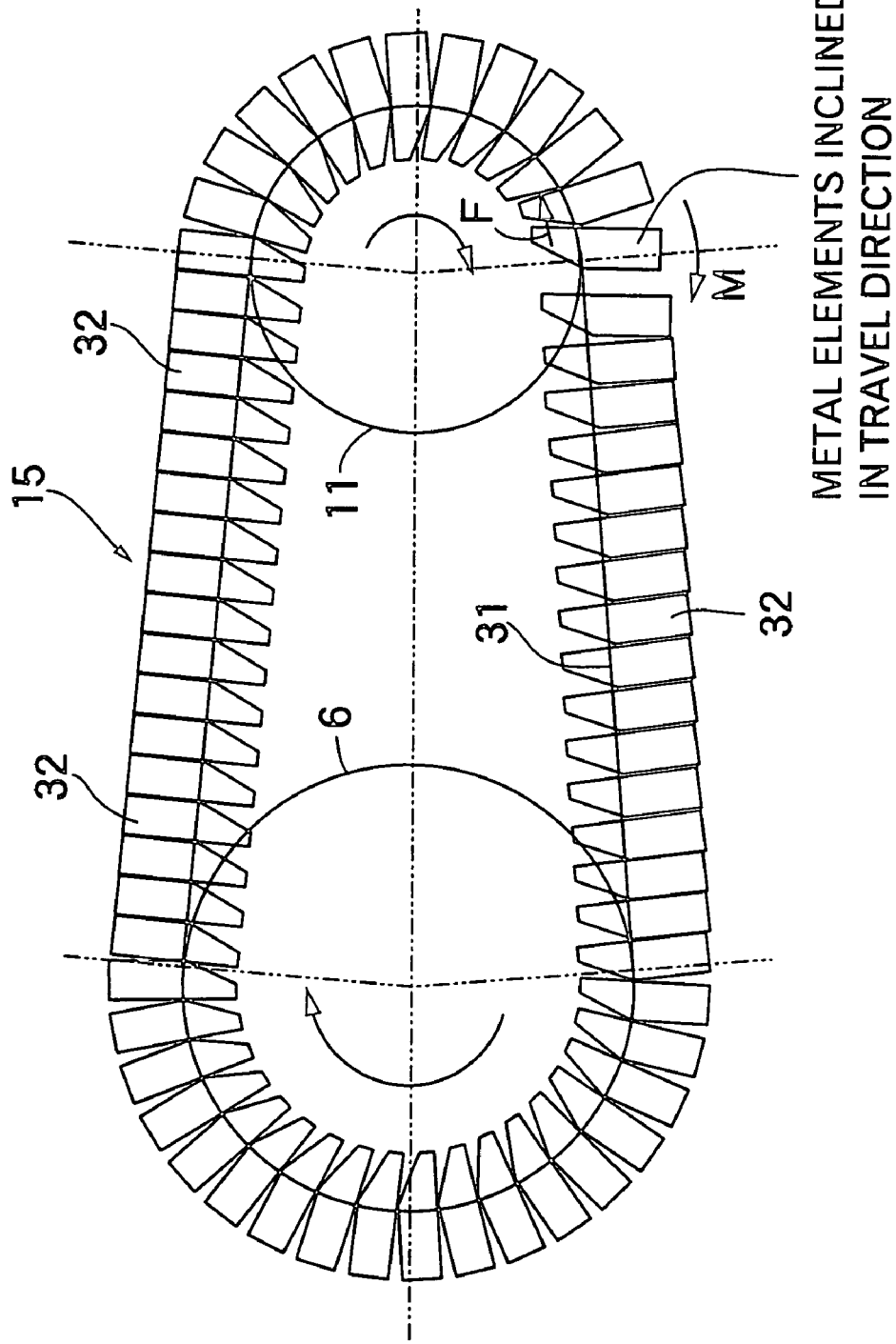
FIG. 10 is an illustration showing the inclination of the metal elements in the vicinity of an exit portion of a driven pulley.

A pair of pulley-abutment faces 39, 39 are formed at laterally opposite ends of the element body 34 and capable of abutting against V-faces of the drive pulley 6 and the driven pulley 11. Formed on the front and rear portions of the metal element 32 is a pair of front and rear main surfaces 40, 40 which are perpendicular to the travel direction and parallel to each other. An inclined face 42 is formed below the front main surface 40 with a laterally extending locking edge 41 located therebetween. Further, formed on the front and rear surfaces of the ear 37 are a projection 43f and a recess 43r (see FIG. 4) for connecting the metal elements 32, 32 in the forward and backward directions As already described with reference to FIGS. 7 to 10, in the vicinity of an exit of the driven pulley 11 of the metal belt type continuously variable transmission T, the metal elements 32 are inclined in such a manner that they are fallen forwards. In this case, in the conventional metal belt 15 having no retainers 44, 44, there is a possibility that rear ends a of the saddle faces 38L, 38L of the ring slots 35, 35 in the metal element 32 and front ends b of the lower faces 38U, 38U of the ear as viewed in the travel direction strongly abut against the inner and outer peripheral surfaces of the metal ring assemblies 31, 31, respectively, as shown in FIG. 8, and the metal rings 33 are worn by a stress σH generated at such abutment portions (see FIG. 8). In the present embodiment, however, the outer peripheral surfaces of the metal ring assemblies 31, 31 are put into contact with the front ends b of the lower faces 38U, 38U of the ear via the retainers 44, 44, as shown in FIG. 4, and the retainers 44, 44 can be resiliently deformed to absorb a shock (see FIG. 4), because the clearances α and β exist radially inside and outside the retainers 44, 44.

As described above, when the shock acting on the front ends b of the lower faces 38U, 38U of the ear as viewed in the travel direction has been buffered by the resilient deformation of the retainers 44, 44, a shock acting on a reaction to the rear ends a of the saddle faces 38L, 38L as viewed in the travel direction is also buffered. Thus, the wear of the metal belt is 15 can be prevented by a simple structure in which the two retainers 44, 44 are only added without subjecting the metal elements 32 to a special processing.

If there is a rolling of the metal element 32 generated when the metal element 32 is meshed with the drive pulley 6, the following problem is encountered: The pulley-abutment faces 39, 39 of the metal element 32 cannot be smoothly engaged with the V-faces of the drive pulley 6, thereby generating an abnormal wear and/or noise. However, the rolling of the metal element 32 is inhibited by the shock absorbing effect provided by mounting the retainers 44, 44 (see FIG. 6A), because the clearances between the retainers 44, 44 and the lower faces 38U, 38U of the ear can be set smaller than those in the prior art (see FIG. 6B). Thus, the metal element 32 can be smoothly meshed with the drive pulley 6, thereby inhibiting the generation of the abnormal wear and noise, to enhance the durability of the metal element 32 and the drive pulley 6. The flexural rigidity of the retainers 44, 44 is set lower than that of the metal ring assemblies 31, 31 so that there is no influence on the efficiency.

Figure 11:
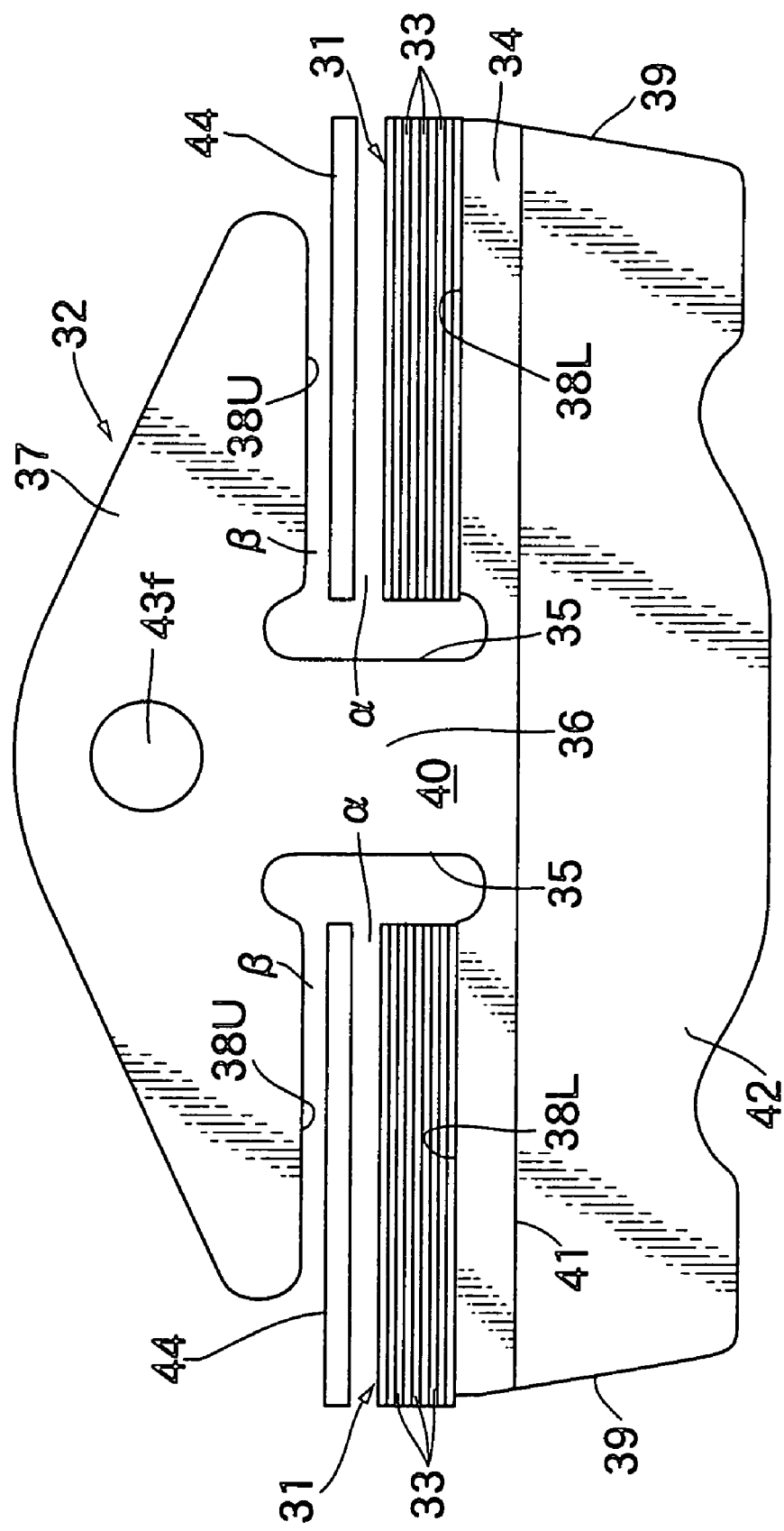
FIG. 11 is a view similar to FIG. 3, but according to a second embodiment of the present invention.

A second embodiment of the present invention will now be described with reference to FIG. 11.

The retainer 44 in the first embodiment comprises the laminate of the two metal rings 45, 45, but a retainer 44 in the second embodiment comprises a single metal ring. In this case, the thickness of a material can be set as desired according to the resilience performance of the metal ring. The thickness of the metal ring of the retainer 44 in the present embodiment is larger than that of the metal ring 33 of the metal ring assembly 31, but the metal ring of the retainer 44 in the present embodiment may be formed to have a thickness smaller than that of the metal ring 33 by using a material having a higher rigidity.

Figure 12:
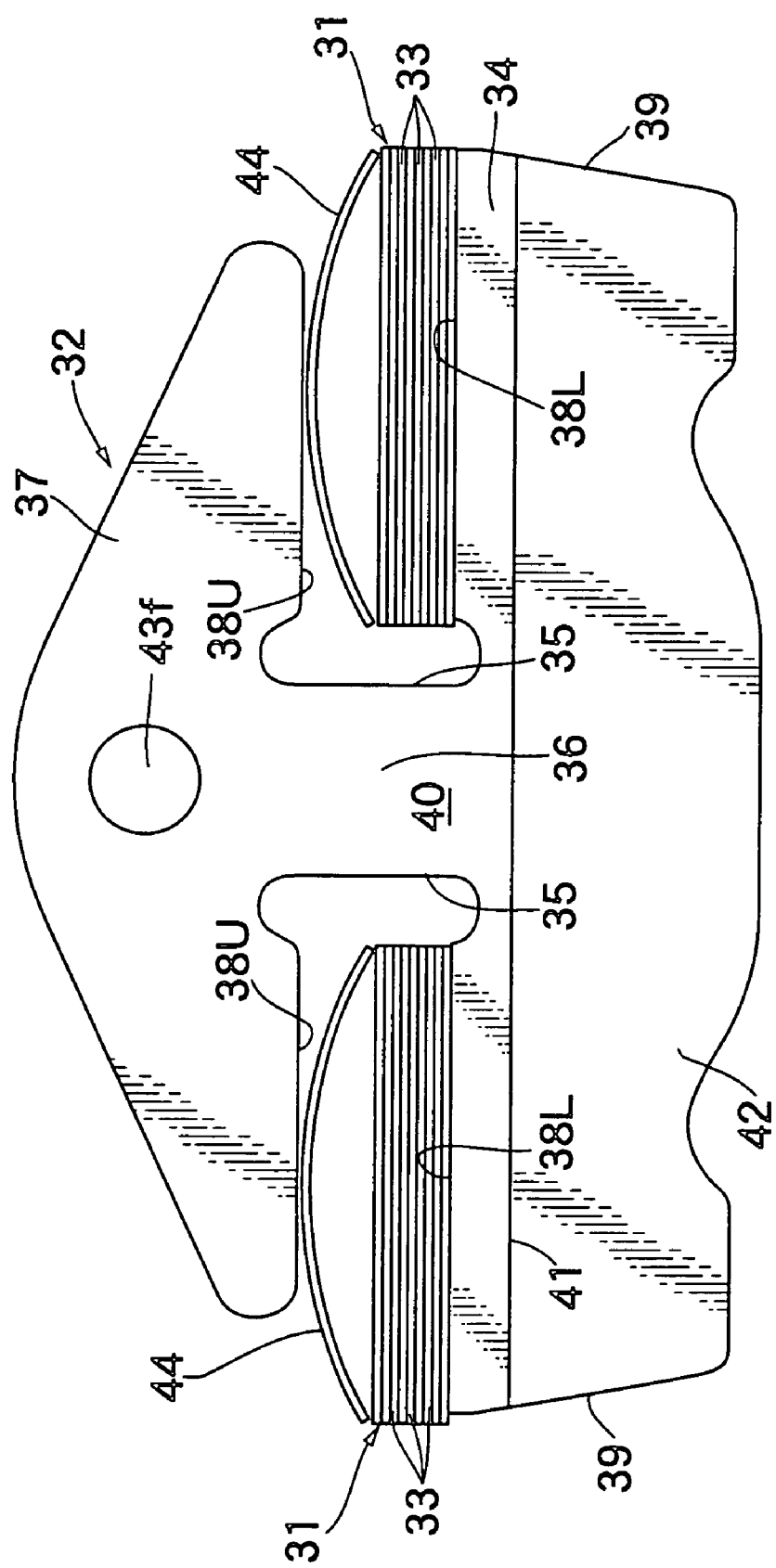
FIG. 12 is a view similar to FIG. 3, but according to a third embodiment of the present invention.

A third embodiment of the present invention will be described below with reference to FIG. 12.

A retainer 44 in the third embodiment also comprises a single metal ring, but has a widthwise-central portion curved radially outwards in a convex shape. This curved portion can exert a shock-absorbing function to achieve an effect similar to that in each of the first and second embodiments. In this case, the retainer 44 may be in contact with the metal ring assembly 31 and the lower face 38U of the ear.

As discussed above, according to the first feature of the present invention, the endless resilient member which is elastically deformable radially is disposed between the radially outer edge of the ring slot in the metal element and the radially outer peripheral surface of the metal ring assembly.

Therefore, when the metal elements are inclined in such a manner that they are fallen forwards in the vicinity of an exit portion of the driven pulley of the metal belt-type continuously variable transmission, the metal element can be prevented from strongly interfering with the radially outer and inner edges of the ring slot in the metal ring assembly by a buffering action provided when the resilient member is deformed radially, thereby preventing the wear of the metal belt to enhance the durability thereof. Moreover, the belt is of a simple structure in which the resilient member is only added without subjecting the metal element to a special processing, and hence, the belt can be realized at an extremely low cost.

According to the second feature of the present invention, the peripheral length of the radially inner peripheral surface of the resilient member is longer than that of the radially outer peripheral surface of the metal ring assembly, and hence, a clearance can be created between the resilient member and the metal ring assembly, to thereby further increase the buffering action of the resilient member.

Although the embodiments of the present invention have been described in detail, it will be understood that various modifications in design may be made without departing from the subject matter of the invention.

What is claimed is:

1. A belt for a continuously variable transmission, which is wound around a drive pulley and a driven pulley for transmitting a driving force between both the pulleys, the belt comprising a pair of metal ring assemblies each formed of a plurality of endless metal rings laminated one on another, and a large number of metal elements each having a ring slot into which each of the metal ring assemblies are fitted, wherein
    an endless resilient member which is elastically deformable radially is disposed between a radially outer edge of each of the ring slots in the metal elements and a radially outer peripheral surface of each of the metal ring assemblies;
    wherein a radial thickness of said endless resilient member is set smaller than a distance between the radially outer edge of each ring slot and the radially outer peripheral surface of the metal ring assembly when supported on a radially inner end of the ring slot and a shock to be acted from the metal element on the metal ring assembly during operation of the transmission is buffered by said resilient member being resiliently deformed in a radial direction.

2. The belt of claim 1 wherein the peripheral length of the radially inner peripheral surface of each of the inner most resilient members is set longer than that of the radially outer peripheral surface of the outermost ring of each of the pair of metal ring assemblies.

3. The belt of claim 1, wherein the resilient member has a widthwise-central portion curved radially outwards in a convex shape.

4. A belt for a continuously variable transmission, which is wound around a drive pulley and a driven pulley for transmitting a driving force between both the pulleys, the belt comprising a metal ring assembly formed of a plurality of endless metal rings laminated one on another, and a large number of metal elements each having a ring slot into which the metal ring assembly is fitted,
    wherein an endless resilient member which is elastically deformable radially is elastically disposed between a radially outer edge of the ring slot in the metal element and a radially outer peripheral surface of the metal ring assembly; and,
    wherein a radial thickness of said endless resilient member is set smaller than a distance between the radially outer edge of each ring slot and the radially outer peripheral surface of the metal ring assembly when supported on a radially inner end of the ring slot and a shock to be acted from the metal element on the metal ring assembly during operation of the transmission is buffered by said resilient member being resiliently deformed in a radial direction.

5. The belt of claim 4, wherein the resilient member has a widthwise-central portion curved radially outwards in a convex shape.

6. A belt for a continuously variable transmission, which is wound around a drive pulley and a driven pulley for transmitting a driving force between both the pulleys, the belt comprising a metal ring assembly formed of a plurality of endless metal rings laminated one on another, and a large number of metal elements each having a ring slot into which the metal ring assembly is fitted,
    wherein said metal ring assembly is interposed between the radially outer edge of the ring slot and a saddle face of the metal element constituting a radially inner edge of said ring slot,
    wherein an endless resilient member which is elastically deformable radially is disposed between said radially outer edge of the ring slot and a radially outer peripheral surface of the metal ring assembly; and
    wherein a radial thickness of said endless resilient member is set smaller than a distance between the radially outer edge of each ring slot and the radially outer peripheral surface of the metal ring assembly when supported on the saddle face of the metal element and a shock to be acted from the metal element on the metal ring assembly during operation of the transmission is buffered by said resilient member being resiliently deformed in a radial direction.

7. The belt of claim 6, wherein the resilient member has a widthwise-central portion curved radially outwards in a convex shape.

* * * * *

UNITED STATES PATENT AND TRADEMARK OFFICE
CERTIFICATE OF CORRECTION

PATENT NO. : 7,077,775 B2 Page 1 of 1
APPLICATION NO. : 09/921996
DATED : July 18, 2006
INVENTOR(S) : Katsuya Yoshida It is certified that error appears in the above-identified patent and that said Letters Patent is hereby corrected as shown below:

Title Page and column 1, Line 1 -

Item (54) Title Information, please correct the title to read as follows:

-- BELT FOR CONTINUOUSLY VARIABLE TRANSMISSON --

Signed and Sealed this

Fourteenth Day of November, 2006

JON W. DUDAS
*Director of the United States Patent and Trademark Office*